(12) United States Patent
Bhardwaj et al.

(10) Patent No.: US 8,880,729 B2
(45) Date of Patent: Nov. 4, 2014

(54) METHOD AND APPARATUS FOR ROUTING REQUESTS FOR SERVICE USING BGP COMMUNITY ATTRIBUTES

(75) Inventors: Manish Bhardwaj, San Jose, CA (US); Stefano Benedetto Previdi, Rome (IT); Steven Vincent Luong, San Jose, CA (US); Christopher Losack, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 13/109,461

(22) Filed: May 17, 2011

(65) Prior Publication Data
US 2012/0102225 A1    Apr. 26, 2012

Related U.S. Application Data

(60) Provisional application No. 61/406,042, filed on Oct. 22, 2010.

(51) Int. Cl.
  *G06F 15/173* (2006.01)
  *H04L 12/66* (2006.01)
(52) U.S. Cl.
  CPC ..................... *H04L 12/66* (2013.01)
  USPC ....................................................... 709/241
(58) Field of Classification Search
  USPC .......... 709/241, 226, 223, 224; 370/236, 230, 370/241
  See application file for complete search history.

(56) References Cited

U.S. PATENT DOCUMENTS

| | | | |
|---|---|---|---|
| 2003/0191841 A1* | 10/2003 | DeFerranti et al. | 709/226 |
| 2003/0195984 A1* | 10/2003 | Zisapel et al. | 709/238 |
| 2007/0130355 A1* | 6/2007 | Shah | 709/230 |
| 2008/0065772 A1* | 3/2008 | Tindal et al. | 709/226 |
| 2009/0190583 A1* | 7/2009 | Accetta et al. | 370/389 |
| 2010/0002604 A1* | 1/2010 | Melick et al. | 370/254 |
| 2010/0069096 A1* | 3/2010 | Poola et al. | 455/466 |
| 2010/0125643 A1* | 5/2010 | Gerber et al. | 709/217 |
| 2010/0265846 A1* | 10/2010 | Weniger | 370/254 |
| 2010/0309789 A1 | 12/2010 | Previdi et al. | |
| 2012/0324044 A1* | 12/2012 | Aranda Gutierrez | 709/217 |

OTHER PUBLICATIONS

A. Retana, R. White; "BGP Custom Decision Process;" http://tools.ietf.org/html/draft-retana-bgp-custom-decision-02; 9 pages, May 9, 2011.

* cited by examiner

*Primary Examiner* — Hassan Kizou
*Assistant Examiner* — Gustavo Lopez-Vargas
(74) *Attorney, Agent, or Firm* — Baker Botts L.L.P.

(57) ABSTRACT

According to one embodiment, an apparatus that makes improved routing decisions is provided that includes a receiver, a retriever, a proximity engine, and a transmitter. The receiver may be configured to receive a request from a source. The retriever may be configured to retrieve a plurality of providers capable of servicing the request. The proximity engine may be configured to rank the plurality of providers based on weights indicative of a network distance. The weights may correspond to a first Border Gateway Protocol (BGP) community attribute associated with the source and at least a second BGP community attribute associated with at least one of the providers in the plurality of providers. The transmitter may be configured to transmit the request to the provider in the plurality of providers with the highest ranking.

9 Claims, 2 Drawing Sheets

US 8,880,729 B2

METHOD AND APPARATUS FOR ROUTING REQUESTS FOR SERVICE USING BGP COMMUNITY ATTRIBUTES

RELATED APPLICATIONS

The present application claims the benefit of U.S. Provisional Application No. 61/406,042 entitled "User Defined BGP Source-Target Community Association for Service Routing," by Bhardwaj, et al., filed Oct. 22, 2010.

TECHNICAL FIELD

This invention relates generally to Internet communications, and more particularly to a method of routing requests for service using BGP community attributes of clients and providers.

BACKGROUND

As the Internet has grown, Internet service providers have expanded to provide more services to clients. The question is no longer "which provider can service my request," but rather "which provider is the best to handle my request." Routers are responsible for transmitting requests for service to the appropriate providers according to policies set by router administrators. However, these policies sometimes result in inefficient routes or routes to providers that are not best suited to handle the received request.

SUMMARY

According to one embodiment, a method of routing by a computing device begins by receiving a request from a source at the computing device. The method continues by retrieving, by the computing device, a plurality of providers capable of servicing the request. The method further includes ranking, by the computing device, the plurality of providers based on weights indicative of a network distance. The weights may correspond to a first Border Gateway Protocol (BGP) community attribute associated with the source and at least a second BGP community attribute associated with at least one of the providers in the plurality of providers. The method continues by transmitting, by the computing device, the request to the provider in the plurality of providers with the highest ranking.

According to another embodiment, an apparatus is provided that includes a receiver, a retriever, a proximity engine, and a transmitter. The receiver may be configured to receive a request from a source. The retriever may be configured to retrieve a plurality of providers capable of servicing the request. The proximity engine may be configured to rank the plurality of providers based on weights indicative of a network distance. The weights may correspond to a first Border Gateway Protocol (BGP) community attribute associated with the source and at least a second BGP community attribute associated with at least one of the providers in the plurality of providers. The transmitter may be configured to transmit the request to the provider in the plurality of providers with the highest ranking.

Technical advantages of certain embodiments of the present disclosure include providing a way to accurately route requests for service to a provider capable of efficiently servicing the request. Specifically, a router administrator may set up routing policies that rank providers using their BGP community attributes, and route requests to the highest ranked providers. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1A:
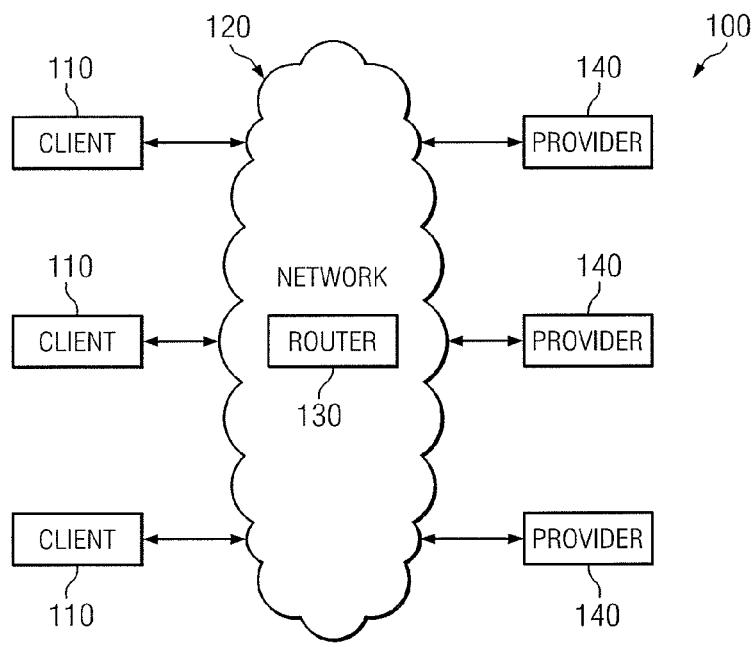
FIG. 1A is a schematic diagram of a network environment.

FIG. 1A is a schematic diagram of a network environment 100 that includes clients 110, providers 140, network 120, and a computing device. Network environment 100 may include a plurality of clients 110 and a plurality of providers 140. This disclosure contemplates any suitable clients 110. A client 110 may enable a user at client 110 to access or otherwise communicate with network 120, providers 140, or other clients 110. In particular embodiments, clients 110 may be configured to send requests to be serviced by providers 140. Requests may be sent through network 120 or through the computing device.

Network 120 may include a computing device, for example, a router 130. As an example and not by way of limitation, router 130 may be a home router, a small office router, a core router, or a combination of two or more of these. In particular embodiments, router 130 may be configured to forward requests from clients 110 to providers 140. In some embodiments, router 130 may determine which providers 140 are capable of servicing a particular request, and may forward the request to the provider 140 that is determined to be the most suitable provider 140 based on a ranking algorithm. As an example, router 130 may be configured to rank providers 140 based on network response time and to forward requests to the highest-ranked provider 140. As another example and not by way of limitation, router 130 may be configured to make routing decisions using the Border Gateway Protocol (BGP).

Figure 1B:
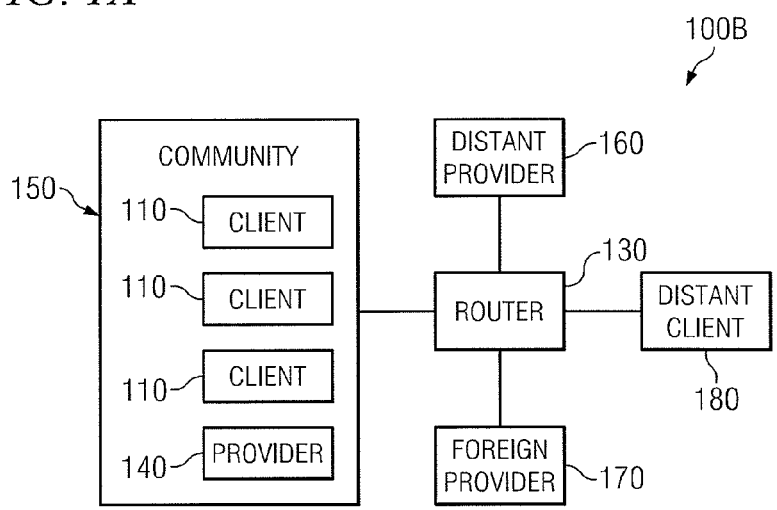
FIG. 1B is a schematic diagram of a network environment that utilizes the Border Gateway Protocol (BGP).

FIG. 1B is a schematic diagram of a network 100B that utilizes BGP. Network 100B may include a router 130, clients 110 and providers 140 organized in a community 150, a distant provider 160, a foreign provider 170, and a distant client 180. In particular embodiments, router 130 may route requests from clients 110 to a provider 140, distant provider 160, or foreign provider 170 using BGP. That is, router 130 may determine where to route a request from a client based on configured policies. In particular embodiments, router 130 may be configured to route requests based on the communities 150 to which provider 140, distant provider 160, and foreign provider 170 belong. As an example and not by way of limitation, router 130 may be configured to route a request from client 110 in community 150 to provider 140 because provider 140 is in the same community 150 as client 110. As another example and not by way of limitation, router 130 may be configured to route a request from distant client 110 to distant provider 160, because distant client 110 and distant provider 160 may be in communities that are associated with each other, even though they may be in different communities. In particular embodiments, a router administrator may configure router 130 to associate particular communities. In some embodiments, the association between particular communities may be stronger than associations with other communities.

According to the teachings of the disclosure, an administrator of router 130 may set up a routing algorithm that ranks providers 140 by their BGP community attributes. As an example and not by way of limitation, the administrator may set up router 130 to route a particular request to a first provider 140 with a BGP community attribute closely associated with the BGP community attribute of the client 110 instead of to a second provider 140 which may have a better network response time. Although the BGP community attribute of the first provider 140 may not be the same as the BGP community attribute of client 110, router 130 may still be configured to closely associate the BGP community attribute of the first provider 140 and BGP community attribute of client 110, and route packets accordingly. As another example and not by way of limitation, the administrator of router 130 may set up a routing algorithm that associates ranges of BGP community attributes. In this manner, the administrator may easily create routing algorithms that cover multiple BGP community attributes.

Referring back to FIG. 1A, as an example and not by way of limitation, a client 110 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 110 may be an electronic device including hardware, software, or both for providing the functionality of client 110. As an example and not by way of limitation, a client 110 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 110 may include one or more clients 110; be unitary or distributed; span multiple locations; span multiple machines; span multiple datacenters; or reside in a cloud, which may include one or more cloud components in one or more networks. As an example and not by way of limitation, clients 110 may be web browsers configured to request webpages from providers 140.

This disclosure contemplates any suitable network 120. As an example and not by way of limitation, one or more portions of network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 120 may include one or more networks 120.

Figure 2:
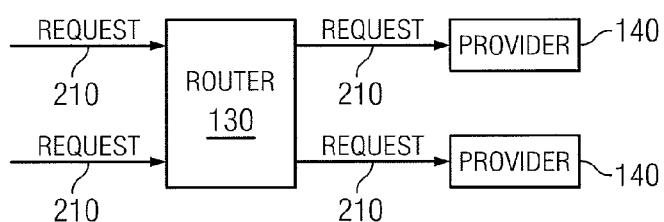
FIG. 2 is a schematic diagram illustrating the dataflow through a router in the network environment of FIG. 1.
Figure 3:
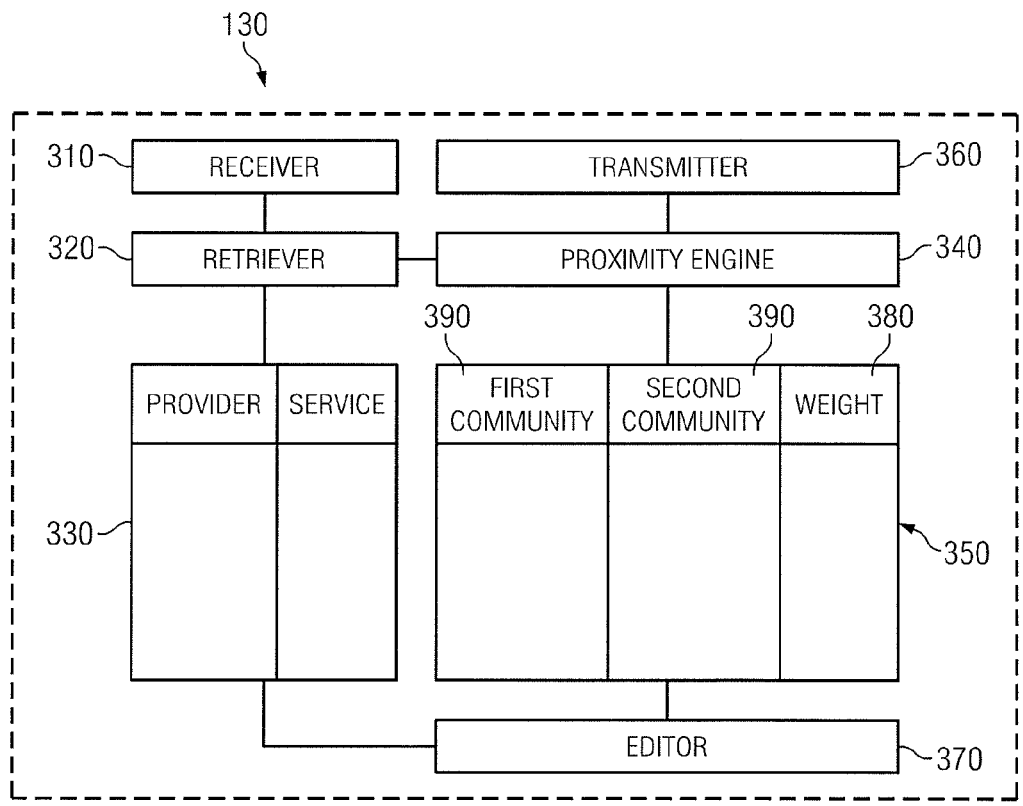
FIG. 3 illustrates certain logical components of a router in the network environment of FIG. 1.
Figure 4:
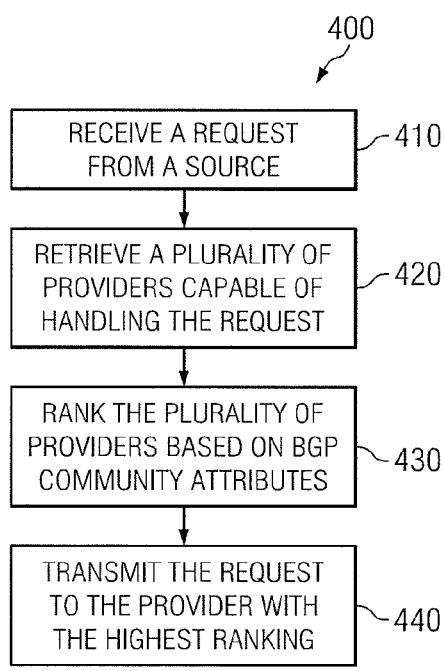
FIG. 4 is a flowchart illustrating a method of routing requests to providers through the network environment of FIG. 1, using the BGP community attributes of the providers.

FIGS. 2 through 4 describe particular embodiments of the present invention. FIG. 2 describes the dataflow through router 130. FIG. 3 describes some of the logical components of router 130. FIG. 4 describes a method executed by router 130 to determine, using the BGP community attributes of providers, the most suitable provider to route a request.

FIG. 2 is a schematic diagram illustrating the dataflow through a router 130 in the network environment of FIG. 1. In particular embodiments, requests 210 may be transmitted from clients to router 130. Router 130 may determine a preferred provider 140 for handling requests 210. Router 130 may then route or transmit requests 210 to the best provider 140.

As provided in FIG. 2, router 130 may receive requests 210. In particular embodiments, requests 210 may originate at a client, such as clients 110, and may include a request for a particular service. As an example and not by way of limitation, requests 210 may include requests for messages, pictures, chat sessions, webpages, or any other suitable service. In particular embodiments, router 130 may receive requests 210 from another router 130.

In particular embodiments, router 130 may be configured to determine a preferred provider 140 for handling a particular request 210. As an example and not by way of limitation, router 130 may rank, according to an algorithm, the providers 140 capable of handling the request. Providers 140 may be ranked based on BGP community and a variety of other criteria including response time, physical proximity, network proximity, BGP community, or any other suitable criterion.

In particular embodiments, router 130 may transmit or route requests 210 to providers 140. In particular embodiments, router 130 may transmit requests 210 to the provider 140 ranked highest according to a particular algorithm. As an example and not by way of limitation, router 130 may transmit requests 210 to the provider 140 with the BGP community attribute most closely associated with the BGP community attribute of the client. In this manner, an administrator of router 130 may be relatively assured that a particular request 210 will be serviced by the best provider 140 based on a particular metric or particular metrics.

FIG. 3 illustrates certain logical components of a router 130 in the network environment of FIG. 1. As provided in FIG. 3, router 130 may include receiver 310, retriever 320, provider service table 330, proximity engine 340, community weight table 350, transmitter 360, and editor 370. Receiver 310 may be configured to receive requests. Retriever 320 may be configured to retrieve a plurality of providers capable of servicing a received request. In particular embodiments, retriever 320 may use provider service table 330 to retrieve the plurality of providers capable of servicing the received request. Proximity engine 340 may be configured to determine the provider in the retrieved plurality of providers best suited to service the received request. In particular embodiments, proximity engine 340 may make this determination using community weight table 350. Transmitter 360 may be configured to transmit the received request to a provider. In particular embodiments, transmitter 360 may be configured to transmit the received request to the best-suited provider as determined by proximity engine 340. In particular embodiments, editor 370 may be configured to edit tables stored in router 130 in response to commands to edit the tables.

Router 130 may include receiver 310. In particular embodiments, receiver 310 may be a network interface card or any other suitable component capable of receiving requests over a network. Receiver 310 may be configured to receive requests from clients. As an example and not by way of limitation, receiver 310 may receive a request for a webpage or for some other suitable data from a provider.

Router 130 may include retriever 320. In particular embodiments, retriever 320 may be configured to retrieve a plurality of providers capable of servicing the received request. In particular embodiments, retriever 320 may retrieve the plurality of providers from a provider service table 330. Provider service table 330 may include a plurality of providers and the respective services they provide. In particular embodiments, retriever 320 may be configured to identify the service requested in the received request and retrieve the providers capable of servicing the request from provider service table 330.

Router 130 may include proximity engine 340. In particular embodiments, proximity engine 340 may be configured to determine the network distance between a client and a provider capable of servicing a particular request. In particular embodiments, proximity engine 340 may determine network distances using a community weight table 350. As an example and not by way of limitation, community weight table 350 may associate a plurality of communities 390 with weights 380. Communities 390 may include the BGP community attributes of clients and providers. Weights 380 may indicate a network distance between a first community 390 and a second community 390. Weights 380 may be a default value or may be assigned by a user or an administrator. In particular embodiments, the higher the weight 380, the more proximate a first community 390 is to a second community 390. In particular embodiments, proximity engine 340 may use weights 380 to rank the providers. As an example and not by way of limitation, proximity engine 340 may rank highest a provider with the BGP community attribute associated with the highest weight 380.

Router 130 may include a transmitter 360. In particular embodiments, transmitter 360 may be configured to transmit the received request to a designated provider. As an example and not by way of limitation, proximity engine 340 may designate the highest ranked provider to transmitter 360. Transmitter 360 may then transmit the received request to the highest ranked provider.

Router 130 may include editor 370. In particular embodiments, editor 370 may be configured to edit tables in router 130 in response to a command to edit. As an example and not by way of limitation, an administrator may issue a command to edit provider service table 330 or community weight table 350. Editor 370 may edit provider service table 330 or community weight table 350 in response.

In particular embodiments, router 130 may accurately route requests for service to a provider capable of efficiently servicing the request. As an example and not by way of limitation, a client may send a request for a webpage to router 130. Router 130 may determine there are two providers capable of servicing the request, a first provider in the same city as the client and a second provider in a faraway city, both providers in different BGP communities than the client. In such a situation, a router administrator may set up community weight table 350 wherein the weight associated with the BGP community attribute of the client and the BGP community attribute of the first provider is greater than the weight associated with the BGP community attribute of the client and the BGP community attribute of the second provider. As a result, router 130 may rank the first provider higher than the second provider when it receives the request from the client. As another example and not by way of limitation, the router administrator may set up community weight table 350 wherein a weight is associated with the BGP community attribute of the client and a range of BGP community attributes, the range including the BGP community attribute of the first provider. In this manner, the router administrator may set up efficient routing protocols using the BGP community attributes of the providers.

FIG. 4 is a flowchart illustrating a method 400 of routing requests to providers through the network environment of FIG. 1, using the BGP community attributes of the providers.

Method 400 may begin with step 410 where a router may receive a request from a source. As an example and not by way of limitation, the router may receive a request to load a particular web page. At step 420, the router may retrieve a plurality of providers capable of handling the request. In particular embodiments, the router may use a provider service table to retrieve the plurality of providers. In step 430 the router ranks the plurality of providers based on their BGP community attributes. In particular embodiments, the router may use a community weight table 350 to rank the plurality of providers. As an example and not by way of limitation, the router may rank highest the provider with the BGP community attribute associated with the highest weight. At step 440 the router may transmit the request to the provider with the highest ranking. In particular embodiments, the provider with the highest ranking may be the provider with the shortest network distance to the source.

In particular embodiments, the router may receive a request from a source, and there may be a provider in the same community as the source capable of servicing the request. The router may determine that the provider is in the same community as the source that made the request, and rank the provider highest amongst all other providers. The router may then forward the request to the provider. In other embodiments, the router may receive a request from a source, and there may be two providers capable of servicing the request, both providers in different communities from each other and from the source. The router may determine, from a preconfigured policy, which provider is in the community most closely associated with the community of the source, and route to that provider. In particular embodiments, the preconfigured policy may include weights associated with particular communities to indicate how closely associated a community is to another. The router may rank highest the provider with the highest weight associated with it.

Although the present invention has been described above in connection with several embodiments, changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A router comprising:
   a receiver configured to receive a request from a source;
   a retriever configured to retrieve a plurality of providers capable of servicing the request;
   a proximity engine configured to:
      determine network distances using a community weight table; and
      rank the plurality of providers based at least on weights indicative of the network distances each weight being a default value or user assigned and corresponding to a first Border Gateway Protocol (BGP) community attribute associated with the source and at least a second BGP community attribute associated with at least one of the providers in the plurality of providers, wherein a higher weight indicates a shorter network distance between the source and the at least one of the providers in the plurality of providers;
   a transmitter configured to transmit the request to the provider in the plurality of providers with the highest ranking; and
   an editor configured to edit at least one of the weights in response to a request to edit the at least one of the weights.

2. A method comprising:
receiving, at a computing device, a request from a source;
retrieving, by the computing device, a plurality of providers capable of servicing the request;
determining, by the computing device, network distances using a community weight table;
ranking, by the computing device, the plurality of providers based on weights indicative of the network distances, each weight being a default value or user assigned and corresponding to a first Border Gateway Protocol (BGP) community attribute associated with the source and at least a second BGP community attribute associated with at least one of the providers in the plurality of providers; and
transmitting, by the computing device, the request to the provider in the plurality of providers with the highest ranking;
receiving, at the computing device, a command to edit at least one of the weights; and
editing the at least one of the weights in response to the command.

3. The method of claim 2, wherein at least some of the weights correspond to a BGP community attribute associated with the source and a range of BGP community attributes associated with at least one provider in the plurality of providers.

4. The method of claim 2, further comprising:
designating, by the computing device, the highest-ranked provider as the provider in the plurality of providers with the shortest network distance to the source.

5. The method of claim 2, wherein ranking the plurality of providers based on weights comprises ranking the plurality of providers based on weights stored in a table.

6. A router configured to receive a request from a source and to retrieve a plurality of providers capable of servicing the request, the router comprising:
a proximity engine configured to:
determine network distances using a community weight table; and
rank the plurality of providers based on weights indicative of the network distances, each weight being a default value or user assigned and corresponding to a first Border Gateway Protocol (BGP) community attribute associated with the source and at least a second BGP community attribute associated with at least one of the providers in the plurality of providers; and
an editor configured to edit at least one of the weights in response to a received command to edit the at least one of the weights.

7. The router of claim 6, wherein the proximity engine is further configured to rank the plurality of providers based on weights corresponding to a BGP community attribute associated with the source and a range of BGP community attributes associated with at least one provider in the plurality of providers.

8. The router of claim 6, wherein the proximity engine is configured to rank highest the provider with the shortest network distance to the source.

9. The router of claim 6, wherein the proximity engine is configured to rank the plurality of providers based on weights stored in a table.

* * * * *